Sept. 5, 1950  G. E. SORENSEN  2,521,027
NIPPERS WITH RETAINER FOR WORK CLIPPINGS
Filed Sept. 27, 1947
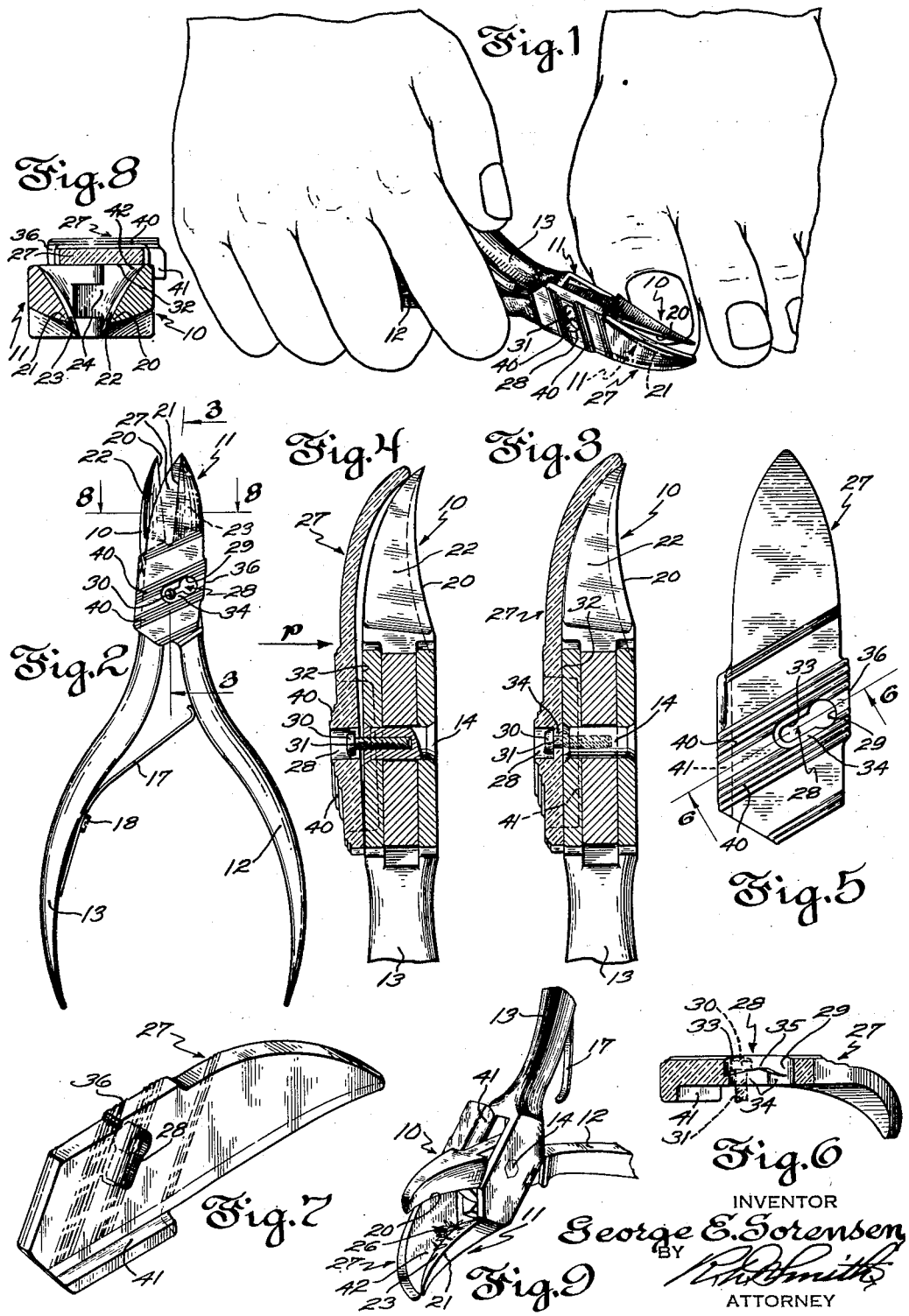
INVENTOR
George E. Sorensen
BY
ATTORNEY Patented Sept. 5, 1950

2,521,027

UNITED STATES PATENT OFFICE 2,521,027

NIPPERS WITH RETAINER FOR WORK CLIPPINGS

George E. Sorensen, Stratford, Conn., assignor to O. E. Sorensen, Incorporated, Bridgeport, Conn., a corporation of Connecticut Application September 27, 1947, Serial No. 776,591

11 Claims. (Cl. 30—28)

This invention relates to nipping implements of the plier type and particularly concerns improvements in such implements intended for use in cutting or trimming toenails or fingernails.

The clipping action of ordinary pedary or manicuring nippers causes the nail clippings to be snapped away from the implement in uncontrolled directions. An object of this invention is to prevent the clippings from being projected away from the implement by confining and accumulating them in a catch space which may be formed at least in part by one or both of the instrument jaws until the accumulated clippings are purposely discharged from or dumped out of such space.

Another object is to provide a conventional nipper implement with a clippings retainer which is firmly but removably lodged in place on the implement and preferably without resort to extraneous fastening means, whereby mere finger pressure combined with finger shoving action suffices to apply and remove the retainer.

Still further objects are to provide conventional metallic nippers with a neat streamlined retainer of minimum bulk having graceful and pleasing lines and tinted with color whether or not transparent for thereby lending a gay and dressed-up tone to the otherwise utilitarian appearance of metallic nippers.

The foregoing and related aims of the invention will become evident in connection with the following description and drawings having reference thereto disclosing a successful embodiment of the invention, in which drawings:

Fig. 1 illustrates in pedary use a nipping implement with clippings retainer incorporating the present improvements.

Fig. 2 is an elevation of the implement shown in Fig. 1 in preferred actual size.

Fig. 3 is an enlarged view of the jaws of the implement taken in section on the plane 3—3 in Fig. 2 looking in the direction of the arrows.

Fig. 4 is a view similar to Fig. 3 with the clippings retainer normally bowed or unsprung as before fastening it to the jaw of the nippers.

Fig. 5 shows the clippings retainer as viewed in Fig. 2 on a larger scale similar to Fig. 3 and removed from the implement.

Fig. 6 is a view taken in section on the plane 6—6 in Fig. 5 looking in the direction of the arrows.

Fig. 7 is a perspective view of the retainer removed from the nipper jaws.

Fig. 8 is a view taken in section on the plane 8—8 in Fig. 2 looking in the direction of the arrows.

Fig. 9 is a fragmentary perspective view of the clippings catch pocket.

Fig. 1 illustrates a conventional manner of use of pedary nippers in clipping a toenail, the implement here illustrated being equipped with a practical form of clippings retainer embodying the present invention.

The nipper implement herein shown is conventional in having two levers including nipper jaws 10 and 11 respectively integral with handles 12 and 13 hinged together for relative swinging movement by means of a pivot pin 14 fixed in rotative relation to jaw 11 and with respect to which the jaw 10 is free to swing. Also as in common practice, one of the handles 13 carries attached thereto a leaf spring 17 fastened by a screw or rivet 18 at a median point in its length so that one end of leaf spring 17 is free for resilient flexing while bearing against the other handle 12 in a manner constantly urging the handles to separate and constantly urging the nipper jaws toward their open relationship shown in Fig. 2. When the jaws are manually closed by squeezing the handles toward each other, the work clipping edges 20 and 21 meet throughout their length. They are held together for so meeting by the axial thrust afforded by the headed-over ends of pivot pin 14.

Two of the broadside jaw faces 22 and 23 of jaws 10 and 11, respectively, are relatively inclined so that when the edges 20 and 21 meet, these jaw faces combine to form a concavity 24 receptive to clippings nipped off from the work. Such clippings are indicated herein as fragments 26 of a toenail or fingernail. According to the present improvements concavity 24 is bridged by a retainer here shown in the form of a removable guard plate attachment 27 that covers and forms a closure across the concavity operative to retain the clippings 26 therein.

Retainer 27 may have devious forms and be made of various kinds of material but preferably will be a bowed tapering plate neatly conforming in elevation as in Fig. 2 to the outline shape of the jaws of the implement and be carried in fixed relation to one of such jaws 11 in a manner not to interfere with the swinging movement relative thereto of the other jaw 10. Preferably also the retainer shall be instantly attachable and detachable by mere pressure and shoving motion of the operator's finger without use of extraneous fastening means requiring to be separately loosened or removed. These aims are accomplished by novel structural features of the retainer, itself, which are as follows.

As shown in Figs. 5, 6, and 7, the retainer 27 is characterized by particular structural shapes enabling it to be made as a separate piece that is readily detachable as a unit from the implement jaws. It will preferably be made of a springy material and more abruptly bowed lengthwise than is the convex curvature of the concavo-convex jaws of the implement along which the retainer abuts, whereby finger thrust on the retainer toward the convex retainer supporting surface of the implement jaw, or in the direction of arrow P in Fig. 4, will cause a flattening flexure of the retainer yieldingly opposed by its own bowing tendency. This normal bowing tendency of the retainer is made use of to accomplish firm lodgment of the retainer on the support surface of the implement jaw without use of extraneous fastening means. The ends of the retainer or guard plate 27 which bear against the support surface 32 of jaw 11 are spaced apart terminal portions of the plate connected by an intermediate resilient section of the plate that spans the space between them. Thus the resilience in this intermediate section biases the inner and outer surfaces thereof to positions of predetermined free-sprung spacing from jaw surface 32 when the terminal portions of the plate bear lightly against the jaws.

In the molded shape of the retainer such intermediate plate section incorporates anchoring structure in the form of a keyhole-shaped slot 28 whose large end 29 is capable of passing downward over the keeper head 30 of an anchorage device or stud 31 fixed in and projecting from the end of pivot pin 14. In practical construction, anchorage stud 31 may comprise an ordinary metallic drive screw made fast in a hole in one end of the pivot pin and having its keeper head 30 at a predetermined spacing from the support surface 32 of nipper jaw 11. About the keyhole shape of slot 28 the retainer is recessed so that the narrow end 33 of the slot is bordered by a horseshoe-shaped shelf 34 of the same material of which retainer 27 is made. This shelf or floor of the recess forms two inclined planes running lengthwise of the slot sloping in opposite directions from a midpoint apex 35 whereat shelf 34 is thickest. These inclined planes constitute in their region the outer surface of the guard plate and facilitate firm anchorage and easy removal of the retainer as hereinafter explained because keeper 30 is spaced from the aforesaid jaw surface a less distance than the free-sprung position of apex 35. The term "inclined plane" is used in its general sense, meaning an incline which is not of necessity strictly straight nor flat. In its region bordering around the keyhole slot 28 the outer surface of the main body of the retainer plate carries embossed ribbing 40 for decorative purposes which also helps render inconspicuous the head 30 of stud 31 as well as the keyhole slot 28 as a whole when the retainer is lodged in service position on the implement jaw.

Along a portion of one longitudinal edge the retainer 27 carries an angle flange 41 which abuts against the edge of the nipper jaw and prevents the retainer from swiveling about its anchorage stud 31 when the retainer is placed in service position on the implement. Installing the retainer in its lodged service position is accomplished by placing the retainer against the jaw in its unsprung condition as shown in Fig. 4 and then thrusting it forcibly by finger pressure in the direction of arrow P to flatten it into substantially allover conforming contact with the face 32 of the jaw while at the same time shoving the retainer in a direction lengthwise of keyhole slot 28 until the thickest or high spot 35 of the interlocking shelf 34 just cams under the head 30 of anchorage stud 31. Thereupon when finger pressure on the retainer is released the inclined plane on shelf 34 which slopes toward the small end of the keyhole slot will urge the retainer flange 41 firmly against the edge of the clipper jaw and hold the entire retainer snugly in place. This is insured by the clearance space thereupon left between the left extremity of the slot 28 and both the stud 31 and its head 30 best indicated in Fig. 6. The retainer may purposely be removed by reversal of the finger operation which installed it, namely, by depressing its springy body toward the jaw of the instrument and shoving on it in direction to displace flange 41 from contact with the jaw edge until the large end of the key slot hole comes into register with the stud head 30 so that the retainer can be taken off over the stud head 30 away from the instrument jaw. A lug 36 projects slightly edgewise from retainer 27 beyond the otherwise flush edge of the nipper jaw for taking finger thrust when starting to dislodge retainer 27 from its service position.

From the foregoing description it will be clear that when the retainer is in place and the clipping edges are in closed relation there can be no escape of the nail clippings from the space at the concavity 24 of the jaws inside the retainer; also that even when the clipping edges are separated, there remains the catch pocket 42 between the retainer and jaw 11 capable of holding an accumulation of nail clippings 26 as shown in Fig. 9 until they are intentionally dumped out.

If the retainer 27 is made of transparent resilient plastic material having the physical properties elsewhere herein explained the action of the clipping edges upon the work can be observed by looking through the retainer as a window and it can at all times be seen how full of clippings the catch space is so that the user will know when the clippings need to be discharged. The bowed shape of the retainer enhances whatever transparency it may possess by reducing the blinding highlights that reflect in less area from a curved transparent surface than from a flat transparent surface. It has been found that in combination with nickel or chrome plated implement jaws or handles a retainer made of molded plastic that is tinted with color as well as being transparent possesses considerable eye and sales appeal because of dressing up the implement in a way to make it appear more fancy and less utilitarian in character. While herein shown as a detachable piece, retainer 27 may for some purposes of the invention be metallic and may be fixed to or integral with the metal body of one of the nipper jaws.

The advantages of the present improvements are obtainable in variations of the shapes, materials and cooperative relationship of the elements herein chosen to illustrate the invention wherefore the appended claims are directed to and intended to cover as broad range of equivalents and substitutes for the exact parts herein illustrated and described as fairly come within the broadest interpretation of the claim language.

I claim:

1. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening and at least in part possessing resilience operative to bias an inner face and an outer face of said spanning section to positions of predetermined spacing from said jaw surface when said terminal portions bear against the latter, and an anchorage projection connected with said jaw outstanding from said support surface having a plate retaining head broader than at least a portion of said opening and spaced from said jaw surface a less distance than said predetermined position of said outer surface of said plate section.

2. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening and at least in part possessing resilience operative to bias said spanning section into a bowed shape and operative to bias an inner face and an outer face of said spanning section to positions of predetermined spacing from said jaw surface when said terminal portions bear against the latter, and an anchorage projection connected with said jaw outstanding from said support surface having a plate retaining head broader than at least a portion of said opening and spaced from said jaw surface a less distance than said predetermined position of said outer surface of said plate section.

3. Nippers of the plier type for severing-work clippings comprising, in combination, levers respectively including work cutting jaws, a coupling pivotally connecting said levers including thrust means permanently holding said levers axially together for free relative swinging movement, a clippings retaining guard plate to be held against one of said jaws having an anchorage opening, and a headed anchorage element projecting from said coupling through said plate opening in a manner to engage and retain said plate against said jaw, whereby said plate can be released from said element for removal from said jaw without disturbing said thrust means of the lever coupling.

4. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening and at least in part possessing resilience operative to bias an inner face and an outer face of said spanning section to positions of predetermined spacing from said jaw surface when said terminal portions bear against the latter and operative to bias said inner face to assume a curvature more acutely concave than the said support surface of the said nippers jaws, and an anchorage projection connected with said jaw outstanding from said support surface having a plate retaining head broader than at least a portion of said opening and spaced from said jaw surface a less distance than said predetermined position of said outer surface of said plate section.

5. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening bordered by the indented floor of a recess sunk in said spanning section and at least in part possessing resilience operative to bias an inner face of said section and said recess floor to positions of predetermined spacing from said jaw surface when said terminal portions bear against the latter, and an anchorage projection connected with said jaw outstanding from said support surface having a plate retaining head broader than at least a portion of said opening and spaced from said jaw surface a less distance than said predetermined position of said outer surface of said plate section for engagement with said recess floor.

6. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions having an incline on its outer face and an anchorage opening and at least in part possessing resilience operative to bias said incline and the inner face of said section to positions of predetermined spacing from said jaw surface when said terminal portions bear against the latter, and an anchorage projection connected with said jaw outstanding from said support surface having a plate retaining head broader than at least a portion of said opening and spaced from said jaw surface a less distance than said predetermined position of said incline of said plate section, whereby said incline is disposed to engage with and cam under said retaining head of the anchorage projection in a manner to cause said resilient plate section to spring toward said support surface when said plate is forced to slide along the latter.

7. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening bordered by the indented floor of a recess sunk in said plate section disposed to form an incline, said spanning section at least in part possessing resilience operative to bias said incline and the inner face of said section to positions of predetermined spacing from said jaw surface when said terminal portions bear against the latter, and an anchorage projection connected with said jaw outstanding from said support surface having a plate retaining head broader than at least a portion of said opening and spaced from said jaw surface a less distance than said predetermined position of said incline of said plate section, whereby said incline is disposed to engage with and cam under said retaining head of the anchorage projection in a manner to cause said resilient plate section to spring toward said support surface when said plate is forced to slide along the latter.

8. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening and having an outer face sloping in opposite directions from an apex most distant from said support surface in a manner to form inclines, said plate section at least in part possessing resilience operative to bias said inclines and the inner face of said section to positions of predetermined spacing from said jaw surface when said terminal portions bear against the latter, an anchorage projection connected with said jaw outstanding from said support surface having a plate retaining head broader than at least a portion of said opening and spaced from said jaw surface a less distance than said predetermined position of said inclines of said plate section, whereby said inclines are disposed to engage with and cam under said retaining head of the anchorage projection in a manner to cause said resilient plate section to spring toward said support surface as said apex approaches said head in either direction of sliding movement of said plate along said support surface.

9. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening bordered by the indented floor of a recess sunk in said plate section and sloping in opposite directions from an apex most distant from said support surface in a manner to form inclines, said plate section at least in part possessing resilience operative to bias said recess floor and the inner face of said section to positions of predetermined spacing from said jaw surface when said terminal portions bear against the latter, and an anchorage projection connected with said jaw outstanding from said support surface having a plate retaining head broader than at least a portion of said opening and spaced from said jaw surface a less distance than said predetermined position of said recess floor of said plate section, whereby said inclines are disposed to engage with and cam under said retaining head of the anchorage projection in a manner to cause said resilient plate section to spring toward said support surface as said apex of the recess floor approaches said head in either direction of sliding movement of said plate along said support surface.

10. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening and having an outer face sloping in opposite directions from an apex most distant from said support surface in a manner to form inclines, said plate section at least in part possessing resilience operative to bias said inclines and the inner face of said section to positions of predetermined spacing from said jaw surface when said terminal portions bear against the latter, an anchorage projection connected with said jaw outstanding from said support surface having a plate retaining head broader than at least a portion of said opening and spaced from said jaw surface a less distance than said predetermined position of said inclines of said plate section whereby said inclines are disposed to engage with and cam under said retaining head of the anchorage projection in a manner to cause said resilient plate section to spring toward said support surface and simultaneously set up a thrust automatically urging the plate to slide along said support surface as said apex approaches said head in either direction of sliding movement of said plate along said support surface, and a flange on said plate sufficiently distant from said apex to hook over the edge of said support surface in a manner to stay said plate against sliding responsively to said thrust, whereby said plate becomes removably lodged on said support surface.

11. A clippings retainer with means for mounting the same detachably against a nippers jaw, comprising the combination with a support surface on the nippers jaw of, a guard plate having spaced apart terminal portions slidably bearing against said jaw surface and having an intermediate section spanning the space between said terminal portions containing an anchorage opening and having an outer face sloping in opposite directions from an apex most distant from said support surface in a manner to form inclines, said plate section at least in part possessing resilience operative to bias said inclines and the inner face of said section to positions of predetermined spacing from said jaw surface when said terminal portions bear against the latter, an anchorage projection connected with said jaw outstanding from said support surface having a plate retaining head broader than at least a portion of said opening and spaced from said jaw surface a less distance than said predetermined position of said inclines of said plate section whereby said inclines are disposed to engage with and cam under said retaining head of the anchorage projection in a manner to cause said resilient plate section to spring toward said support surface and simultaneously set up a thrust automatically urging the plate to slide along said support surface as said apex approaches said head in either direction of sliding movement of said plate along said support surface, and a flange on said plate sufficiently distant from said apex to hook over the edge of said support surface in a manner to stay said plate against sliding responsively to said thrust whereby said plate becomes removably lodged on said support surface, together with a push lug on said plate projecting sufficiently beyond an opposite edge of said support surface to expose said lug to finger thrust for starting said plate away from its lodged position on said support surface.

GEORGE E. SORENSEN.

REFERENCES CITED

The following references are of record in the file of this patent:

UNITED STATES PATENTS

| Number | Name | Date |
|---|---|---|
| 1,706,712 | Sklar | Mar. 26, 1929 |
| 2,146,132 | Scholl | Feb. 7, 1939 |